United States Patent
Amin et al.

(10) Patent No.: US 10,781,731 B2
(45) Date of Patent: Sep. 22, 2020

(54) METHOD AND ASSEMBLY FOR HEATING AN ENGINE FLUID

(71) Applicant: Ford Global Technologies, LLC, Dearborn, MI (US)

(72) Inventors: Md Shahnoor Amin, Rochester, MI (US); Robert David Hancasky, Royal Oak, MI (US); Erik Dondzila, Canton, MI (US); Ted Haladyna, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 713 days.

(21) Appl. No.: 15/222,311

(22) Filed: Jul. 28, 2016

(65) Prior Publication Data
US 2018/0030865 A1 Feb. 1, 2018

(51) Int. Cl.
*F01M 5/02* (2006.01)
*B60L 53/14* (2019.01)
(Continued)

(52) U.S. Cl.
CPC .............. *F01M 5/021* (2013.01); *B60K 6/40* (2013.01); *B60K 6/445* (2013.01); *B60L 53/14* (2019.02);
(Continued)

(58) Field of Classification Search
CPC .......... F01M 5/02; F01M 5/001; F01M 5/021; B60K 6/20; B60K 6/40; B60K 6/445;
(Continued)

(56) References Cited

U.S. PATENT DOCUMENTS

| | | | | |
|---|---|---|---|---|
| 1,269,310 A | * | 6/1918 | Ringlund | F01M 5/001 184/104.1 |
| 3,870,855 A | * | 3/1975 | Edlund | B60H 1/0025 123/142.5 E |

(Continued)

FOREIGN PATENT DOCUMENTS

| | | |
|---|---|---|
| CA | 2248967 | 2/2000 |
| CN | 2834003 | 11/2006 |
| EP | 1382475 | 2/2004 |

OTHER PUBLICATIONS

Pesaran, A.A., Burch, Stephen, and M. Keyser. An Approach for Designing Thermal Management Systems for Electric and Hybrid Vehicle Battery Packs, Jan. 1999, National Renewable Energy Laboratory/CP-540-25992, pp. 1-18.

(Continued)

*Primary Examiner* — Tu B Hoang
*Assistant Examiner* — Erin E McGrath
(74) *Attorney, Agent, or Firm* — David Kelley, Esq.; Carlson, Gaskey & Olds, P.C.

(57) ABSTRACT

An exemplary fluid heating method includes, among other things, operating an engine of a vehicle to heat an engine fluid during a drive cycle if the vehicle is in a fluid maintenance mode, and heating the fluid prior to the drive cycle if the vehicle is in the fluid maintenance mode and the vehicle is electrically coupled to a grid power source. An exemplary fluid heating assembly includes, among other things, an engine of an electrified vehicle, and a fluid heater that is activated to heat a fluid of the engine in response to the electrified vehicle being in a fluid maintenance mode when electrically coupled to a grid power source.

20 Claims, 4 Drawing Sheets

(51) Int. Cl.
*B60K 6/40* (2007.10)
*B60K 6/445* (2007.10)
*B60R 17/02* (2006.01)
*F01M 5/00* (2006.01)
*B60W 30/18* (2012.01)
*B60W 30/192* (2012.01)
*B60W 20/15* (2016.01)

(52) U.S. Cl.
CPC .............. *B60R 17/02* (2013.01); *F01M 5/001* (2013.01); *B60W 20/15* (2016.01); *B60W 30/18054* (2013.01); *B60W 30/192* (2013.01); *B60Y 2200/92* (2013.01); *B60Y 2306/03* (2013.01); *Y10S 903/951* (2013.01)

(58) Field of Classification Search
CPC ..... B60R 17/00; B60R 17/02; Y10S 903/951; Y10S 903/952; B60Y 2200/92; B60Y 2306/03; B60L 11/1816
USPC ...................... 219/205; 123/142.5 E, 142.5 R
See application file for complete search history.

(56) References Cited

U.S. PATENT DOCUMENTS

| | | | | |
|---|---|---|---|---|
| 4,245,593 | A * | 1/1981 | Stein | ........................ F02N 19/02 |
| | | | | 123/142.5 E |
| 6,378,167 | B1 | 4/2002 | Howell, III et al. | |
| 7,077,224 | B2 | 7/2006 | Tomatsuri et al. | |
| 7,395,803 | B2 | 7/2008 | Ledger et al. | |
| 9,080,558 | B2 | 7/2015 | Penev | |
| 2004/0211386 | A1 * | 10/2004 | Luther | ..................... B60R 17/02 |
| | | | | 123/196 R |
| 2011/0079187 | A1 * | 4/2011 | Steiner | ..................... F01L 1/022 |
| | | | | 123/41.82 R |
| 2011/0155714 | A1 * | 6/2011 | Thomas | ...................... B60L 1/12 |
| | | | | 219/205 |
| 2011/0172890 | A1 * | 7/2011 | Ulrey | ................... F16H 57/0413 |
| | | | | 701/54 |
| 2012/0034797 | A1 | 2/2012 | Jarlett | |
| 2012/0234286 | A1 * | 9/2012 | Quix | ......................... F01M 5/00 |
| | | | | 123/196 AB |
| 2012/0285413 | A1 * | 11/2012 | Pingen | ..................... F01M 5/02 |
| | | | | 123/196 AB |
| 2013/0152892 | A1 * | 6/2013 | Hawkins | ................ F01M 5/021 |
| | | | | 123/142.5 E |
| 2014/0000257 | A1 | 1/2014 | Penev | |
| 2015/0066259 | A1 | 3/2015 | Thompson | |

OTHER PUBLICATIONS

Jakoby, Bernhard, Scherer, Monika, Buskies, Matthias, and Heinz Eisenschmid, An Automotive Engine Oil Viscosity Sensor, Oct. 2003, IEEE Sensors Journal, vol. 3, No. 5, pp. 562-568.

Schwartz, Shirley E., Observations Through a Transparent Oil Pan During Cold-Start, Short-Trip Service, Fuels and Lubricants Department, General Motors Research Labs pp. 1-17.

Malone, G. K., and T.W. Shelby. Relationship of Low-Temperature Cranking Resistance to Viscosity Characteristics of Multigrade Engine Oils, SAE Transactions, Jan. 13, 1956, General Motors Corp., pp. 602-624.

* cited by examiner

METHOD AND ASSEMBLY FOR HEATING AN ENGINE FLUID

TECHNICAL FIELD

This disclosure relates generally to heating an engine fluid. More particularly, the disclosure relates to preheating the engine fluid when a vehicle is in a fluid maintenance mode.

BACKGROUND

Electrified vehicles differ from conventional motor vehicles because electrified vehicles can be driven using drive torque generated from one or more electric machines powered by a traction battery. In some electrified vehicles, an internal combustion engine selectively provide drive torque instead of, or in addition to, the drive torque provide by the electric machines. Example electrified vehicles include hybrid electric vehicles (HEVs), plug-in hybrid electric vehicles (PHEVs), fuel cell vehicles (FCVs), and battery electric vehicles (BEVs).

Some electrified vehicles that include an internal combustion engine can selectively operate in a fluid maintenance mode. In the fluid maintenance mode, the internal combustion engine is forced to operate until an engine fluid reaches a threshold temperature. The fluid maintenance mode can force the internal combustion engine to operate even though drive torque from the internal combustion engine is not required.

Raising a temperature of the engine fluid to meet or exceed the threshold temperature can mitigate degradation of the engine fluid. If not for the fluid maintenance mode, degradation of the engine fluid could accelerate. The vehicle exits the fluid maintenance mode after the threshold temperature has been met or exceeded for a set time.

Electrified vehicles that frequently utilize the internal combustion engine to provide drive torque may operate in the fluid maintenance mode less than electrified vehicle that less frequently use the internal combustion engine to provide drive torque, such as electrified vehicles used for low speed driving or relatively short commutes. As can be appreciated, the time required to reach the threshold temperature can vary depending on a starting temperature of the engine fluid, the engine, or both. That is, a time an electrified vehicle spends in the fluid maintenance mode is related to a starting temperature of the engine fluid.

SUMMARY

A fluid heating method according to an exemplary aspect of the present disclosure includes, among other things, operating an engine of a vehicle to heat an engine fluid during a drive cycle if the vehicle is in a fluid maintenance mode, and heating the fluid prior to the drive cycle if the vehicle is in the fluid maintenance mode and the vehicle is electrically coupled to the grid power source A further non-limiting embodiment of the foregoing method includes heating using power from the grid power source.

A further non-limiting embodiment of any of the foregoing methods includes charging a traction battery of the vehicle when the vehicle is connected to the grid power source.

A further non-limiting embodiment of any of the foregoing methods includes charging during the heating.

A further non-limiting embodiment of any of the foregoing methods includes heating when the engine is not operating.

A further non-limiting embodiment of any of the foregoing methods, includes operating during the drive cycle when the vehicle is electrically decoupled from the grid power source.

A further non-limiting embodiment of any of the foregoing methods includes heating the fluid at a location outside the engine.

A further non-limiting embodiment of any of the foregoing methods includes entering the fluid maintenance mode in response to the vehicle operating without the engine operating.

In a further non-limiting embodiment of any of the foregoing methods, the fluid maintenance mode is an oil maintenance mode.

A further non-limiting embodiment of any of the foregoing methods includes operating the engine in the fluid maintenance mode to combust impurities within the fluid.

A further non-limiting embodiment of any of the foregoing methods includes exiting the fluid maintenance mode in response to the engine operating at a threshold temperature for a threshold time.

A fluid heating assembly according to another exemplary aspect of the present disclosure includes, among other things, an engine of an electrified vehicle, and a fluid heater that is activated to heat a fluid of the engine in response to the electrified vehicle being in a fluid maintenance mode when electrically coupled to a grid power source.

In a further non-limiting embodiment of the foregoing fluid heating assembly, the fluid heater is configured to heat the fluid at a position outside the engine.

In a further non-limiting embodiment of any of the foregoing fluid heating assemblies, the fluid heater is deactivated in response to the electrified vehicle being in a fluid nonmaintenance mode when electrically coupled to the grid power source.

In a further non-limiting embodiment of any of the foregoing fluid heating assemblies, the fluid heater is powered by the grid power source when activated.

In a further non-limiting embodiment of any of the foregoing fluid heating assemblies, the fluid is an oil and the fluid heater is disposed within an oil pan.

In a further non-limiting embodiment of any of the foregoing fluid heating assemblies, the engine is configured to operate during a drive cycle in response to the electrified vehicle being in the fluid maintenance mode.

In a further non-limiting embodiment of any of the foregoing fluid heating assemblies, the vehicle is configured to enter the fluid maintenance mode in response to the vehicle operating without the engine operating.

In a further non-limiting embodiment of any of the foregoing fluid heating assemblies, the vehicle is configured to exit the fluid maintenance mode in response to the engine operating at a threshold temperature for a threshold time.

In a further non-limiting embodiment of any of the foregoing fluid heating assemblies, the heater is an electric resistance heater.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to preheating an engine fluid of an electrified vehicle when the electrified vehicle is electrically coupled to a grid power source and in a fluid maintenance mode. Preheating the engine fluid can reduce a time that the electrified vehicle spends in the fluid maintenance mode during a drive cycle. The preheating of the engine fluid can be powered using power from the grid power source.

Figure 1:
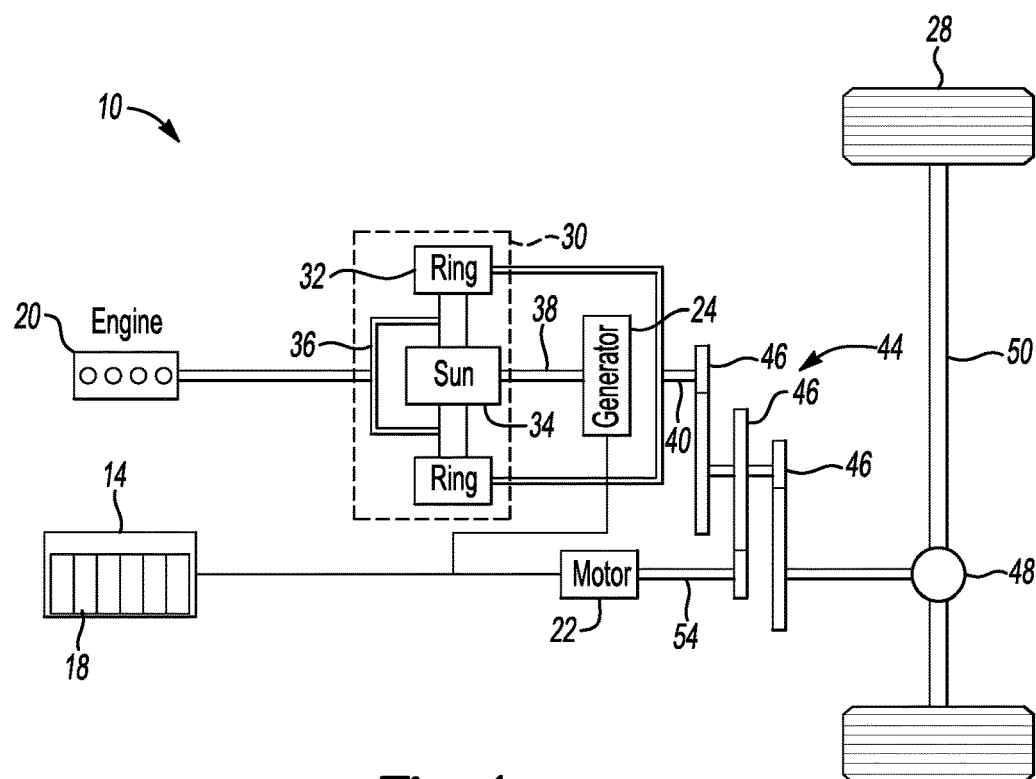
FIG. 1 illustrates a highly schematic view of an example powertrain of an electrified vehicle.

Referring to FIG. 1, a powertrain 10 of a plug-in hybrid electric vehicle (PHEV) includes a traction battery 14 having battery cells 18. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
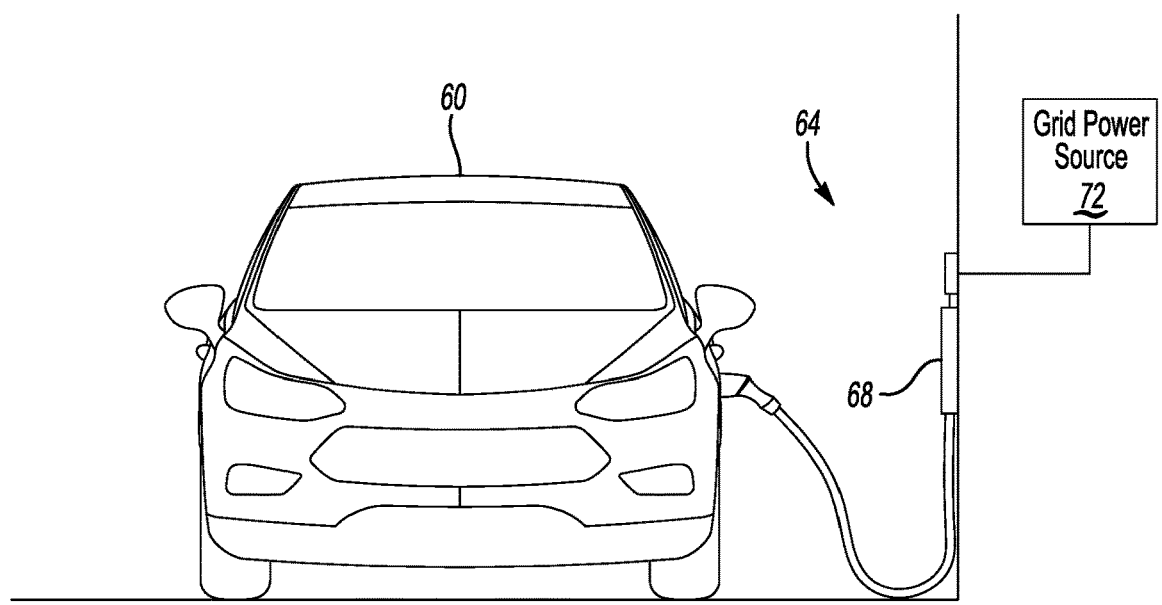
FIG. 2 illustrates an example electrified vehicle having the powertrain of FIG. 1 and electrically coupled to a grid power source that is charging a traction battery of the powertrain.

Referring to FIG. 2 with continuing reference to FIG. 1, an example electrified vehicle 60 incorporates the powertrain 10 of FIG. 1. The example electrified vehicle 60 is a plug-in hybrid electric vehicle (PHEV). In FIG. 2, the electrified vehicle 60 is shown in a charging position where the electrified vehicle 60 is electrically coupled to a charging station 64.

The charging station 64 includes a tether-type charger assembly 68 and a grid power source 72. When the electrified vehicle 60 is electrically coupled to the grid power source 72, power can move from the grid power source 72 to the electrified vehicle 60 through the charger assembly 68. The power can be used to, among other things, recharge the battery cells 18 within the traction battery 14 of the powertrain.

Figure 3:
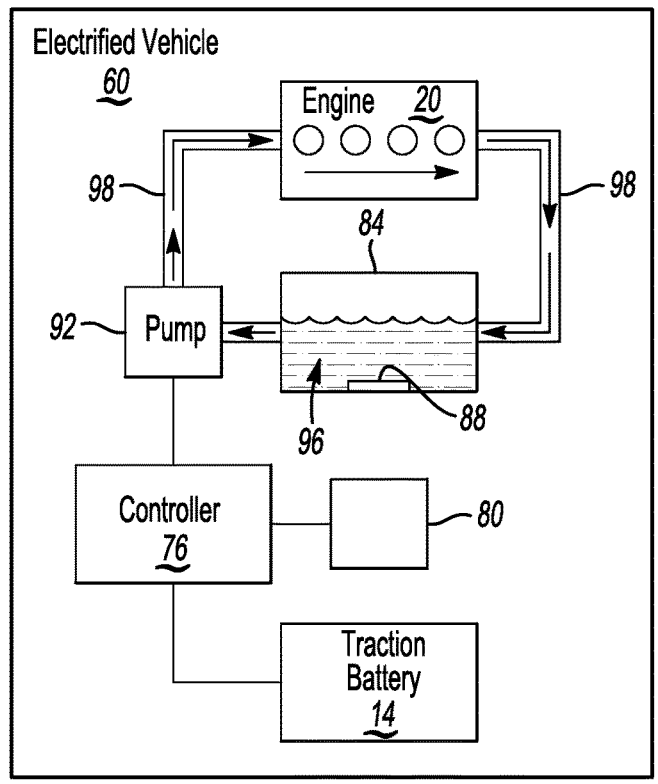
FIG. 3 illustrates a schematic view of selected portions of the electrified vehicle of FIG. 2 during a drive cycle when an internal combustion engine of the electrified vehicle is operating.
Figure 4:
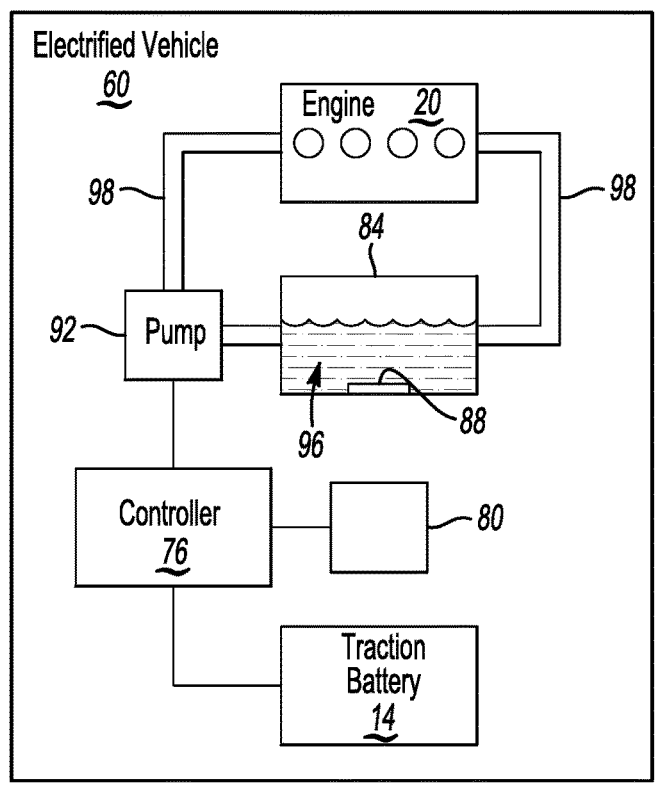
FIG. 4 illustrates a schematic view of selected portions of the electrified vehicle of FIG. 2 during a drive cycle when the internal combustion engine is not operating.

Referring now to FIGS. 3 and 4 with continuing reference to FIGS. 1 and 2, the electrified vehicle 60 includes the engine 20, the traction battery 14, a controller 76, and an electrical switch 80. The electrified vehicle 60 further includes an engine fluid container 84, a heater 88, and an engine fluid pump 92. In this example, the engine fluid 96 is an oil, and the engine fluid container 84 is an oil pan.

In FIGS. 3 and 4, the electrified vehicle 60 is shown operating during a drive cycle when the electrified vehicle 60 is electrically decoupled from the grid power source 72. The drive cycle can begin when the electrified vehicle 60 is keyed on. The drive cycle can end when the electrified vehicle 60 is keyed off.

In FIG. 3, the engine 20 is operating because the engine 20 is required to drive the electrified vehicle 60 by supplying torque to drive wheels. The engine 20 could instead be operating because the electrified vehicle 60 is in a fluid maintenance mode where operating the engine 20 to heat the engine fluid 96 is required. The engine 20 could also be operating to drive the generator 24 (FIG. 1) to charge the traction battery 14.

When the engine 20 is operating, the controller 76 commands the pump 92 to circulate the engine fluid 96 between the engine 20 and the engine fluid container 84 through a plurality of conduits 98. In some examples, the pump 92 is not used and the engine 20 drives circulation of the engine fluid 96. The engine 20 includes some engine fluid 96, as well as conduits 98 extending between the engine fluid container 84 and the engine 20.

Thermal energy levels in the engine 20 and engine fluid 96 increase due to the engine 20 operating. If the thermal energy levels stay above a threshold temperature, for a threshold time, say 20 minutes, impurities in the engine fluid 96 are combusted and a quality of the engine fluid 96 is ensured. In one example, the threshold temperature is an engine temperature of 212 degrees Fahrenheit. In another example, the threshold temperature is a temperature of 175 degrees Fahrenheit for the engine fluid.

In FIG. 4, the traction battery 14 is powering the motor 22 to provide drive torque, and the engine 20 is not operating. When the engine 20 is not operating, the engine fluid 96 is not circulating between the engine 20 and the engine fluid container 84 through the conduits 98. Further, thermal energy levels in the engine 20 and the engine fluid 96 are not increasing due to the engine 20 operating. Over time, if the thermal energy levels in the engine fluid 96 do not increase, impurities can build up in the engine fluid 96.

The controller 76 causes the electrified vehicle to operate in a fluid maintenance mode or a fluid nonmaintenance mode. When in the fluid maintenance mode, the engine 20 is operated to heat the engine fluid 96. The controller 76 is operatively coupled to at least the traction battery 14, the engine 20, the electrical switch 80, and the pump 92.

The controller 76 can include a processor and a memory portion. The processor of the controller 76 is configured to execute a program stored in the memory portion as software code. The program stored in the memory portion can include one or more additional or separate programs, each of which includes an ordered listing of executable instructions for implementing logical functions associated with, for example, determining whether or not the electrified vehicle 60 should operate in the fluid maintenance mode or the fluid nonmaintenance mode.

In one non-limiting embodiment, the processor of the controller 76 comprises a central processing unit in communication with the memory portion, which can include various types of computer readable storage devices or memory devices for executing the exemplary preheating methods of this disclosure.

The controller 76 could be part of an engine control unit (ECU) or could be a separate control system that communicates with the ECU. The controller 76 can include one or more separate control modules equipped with executable instructions for interfacing with and commanding operation of various components of the electrified vehicle 60.

Figure 5:
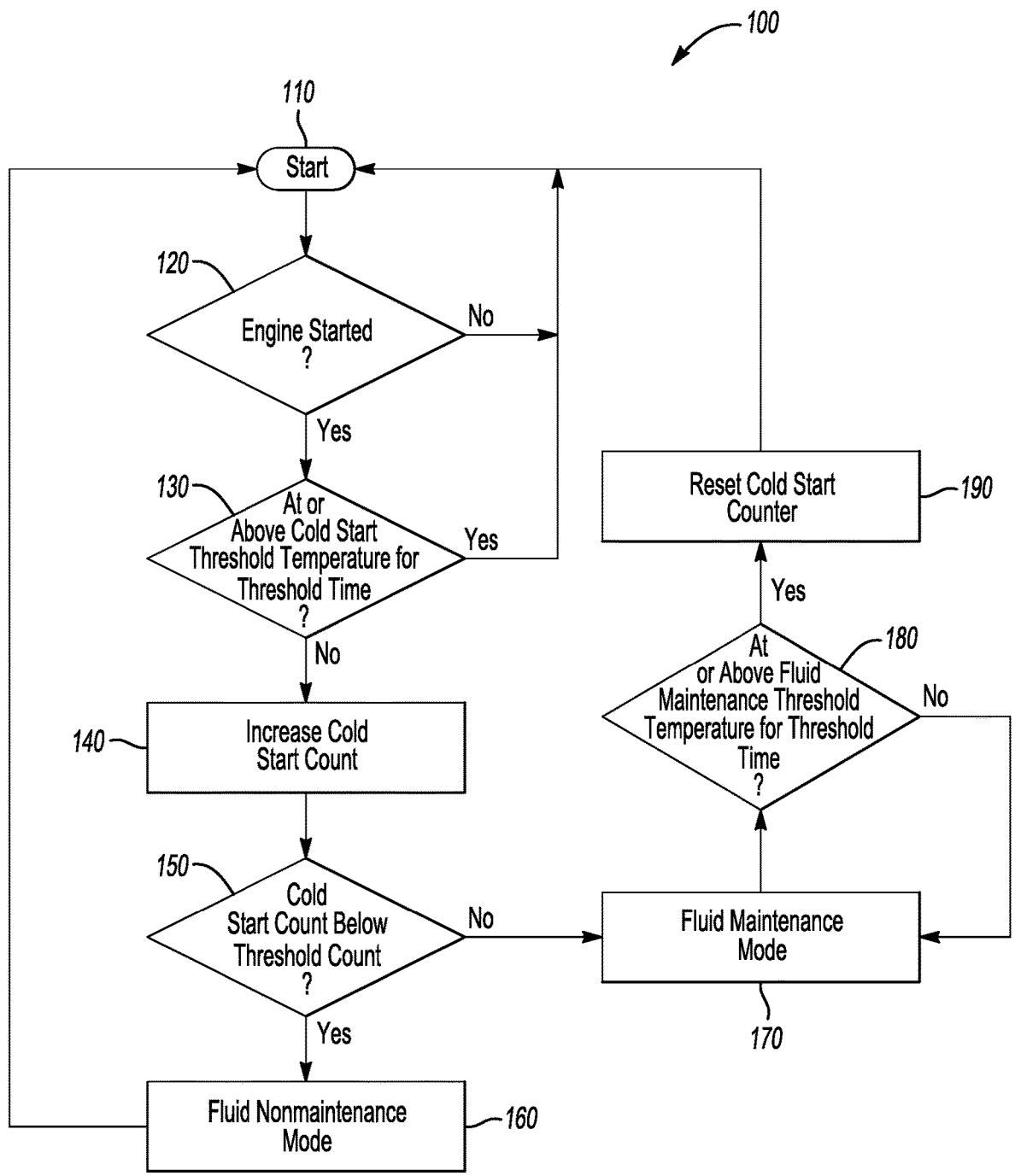
FIG. 5 illustrates steps in an example method of selecting a fluid maintenance mode or a fluid nonmaintenance mode for the electrified vehicle of FIG. 2.

Referring now to FIG. 5 with continuing reference to FIGS. 3 and 4, in a non-limiting embodiment, the controller 76 uses a method 100 to evaluate whether the electrified vehicle 60 should enter or exit the fluid maintenance mode.

The method 100 starts at a start step 110. Next, at a step 120, the method 100 determines whether or not the engine 20 has started. The engine 20 could start, for example, when the electrified vehicle 60 begins a drive cycle. If the engine 20 has not started at the step 120, the method 100 returns to the start step 110. If, at the step 120, the engine 20 has started, the method moves to a step 130, which calculates whether the engine 20 has operated to increase a temperature of the engine fluid 96 to be at or above a threshold temperature for a threshold amount of time.

In one specific example, the threshold temperature is 175 degrees Fahrenheit and the threshold time is 20 minutes. Maintaining the engine fluid 96 at or above the threshold temperature for the threshold time substantially ensures that, among other things, impurities within the engine fluid 96 have been burned off. If, at the step 130, the engine 20 has caused the engine fluid 96 to be at or above the threshold temperature for a threshold amount of time, the method 100 returns to the start step 110. If, at the step 130, engine fluid 96 is not at or exceeding the threshold temperature for the threshold time, the method 100 proceeds to a step 140, which increases an engine cold start count by one. In some examples, the step 130 instead, or additionally, increases a counter in response to an extended time period where the engine 20 has not been used.

The method 100 moves from the step 140 to a step 150, which determines if the cold start count is below a threshold start count. An example of the threshold start count could be, for example, twenty-five cold starts. The controller 76 could include an internal counter portion tracking the threshold start count.

The step 150 could additionally detect a temperature of the engine fluid 96 within the engine fluid container 84 and move back to the start step 110 if the temperature of the engine fluid 96 is already at or above a threshold temperature.

If the engine 20 has cold started less than the threshold start count, the method 100 moves to a step 160, which places (or maintains) the electrified vehicle 60 in the fluid nonmaintenance mode. If, however, at the step 150 the number of cold starts is twenty-five or more and the temperature of the engine fluid 96 within the engine fluid container 84 is less than the threshold temperature, the method 100 moves from the step 150 to a step 170, which causes the electrified vehicle 60 to transition to the fluid maintenance mode.

From the step 170, the method moves to a step 180. At the step 180, the method 100 calculates whether the engine 20 has operated long enough to raise a temperature of the engine fluid 96 to be at or above a fluid maintenance threshold temperature for the threshold time. The fluid maintenance mode is maintained at the step 180 until the calculating that the engine fluid 96 is at or above the fluid maintenance threshold temperature for the threshold time. If calculations or actual measurements reveal that the fluid 96 does not exceed the fluid maintenance temperature for the threshold time, the method 100 remains in the fluid maintenance mode. If calculations or actual measurements reveal that the fluid 96 does exceed the fluid maintenance temperature for the threshold time, the method 100 remains moves to the step 190, which resets the cold start count within the counter to zero, and then moves back to the start step 110.

If the electrified vehicle 60 incorporates the method 100, the electrified vehicle 60 would transition from operating in the fluid nonmaintenance mode to operating in a fluid maintenance mode when the engine 20 has started twenty-five or more times without the engine 20 causing the engine fluid 96 to meet or exceed the threshold temperature for the threshold amount of time. The fluid maintenance mode is then implemented to mitigate degradation of the engine fluid 96.

In this example, the electrified vehicle 60 does not exit the fluid maintenance mode or the fluid nonmaintenance mode at the conclusion of the drive cycle. Thus, at the conclusion of drive cycle, the electrified vehicle 60 could be in the fluid maintenance mode or the fluid nonmaintenance mode.

Figure 6:
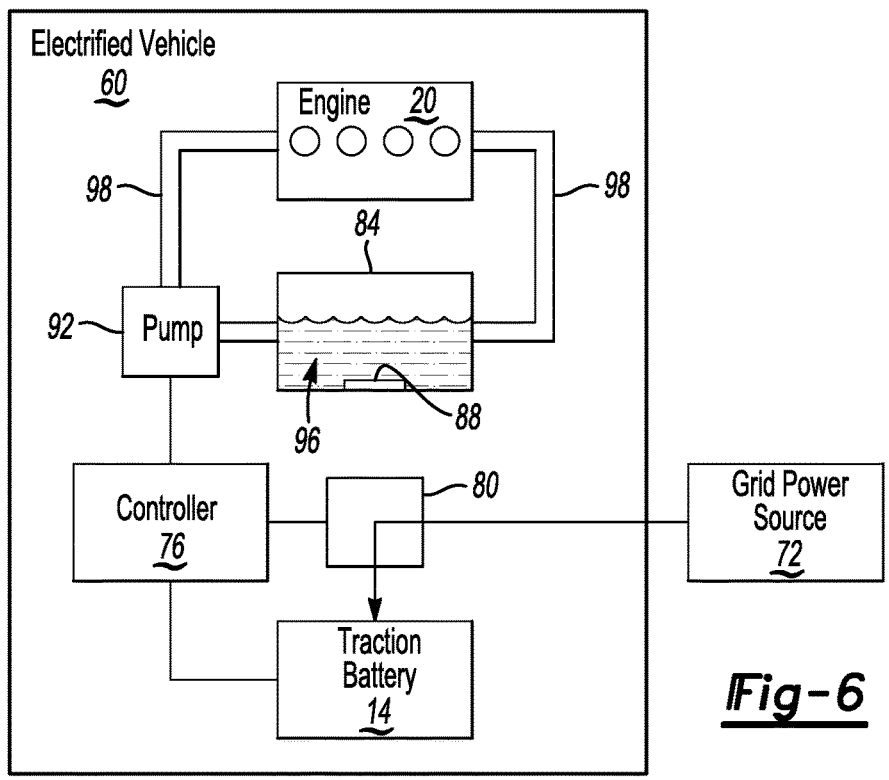
FIG. 6 illustrates a schematic view of selected portions of the electrified vehicle of FIG. 2 when the electrified vehicle is in a fluid nonmaintenance mode and is electrically coupled to the grid power source.

Referring now to FIG. 6, with reference to FIGS. 1 and 2, when the electrified vehicle 60 is electrically coupled to the grid power source 72, the controller 76 is configured to control the electrical switch 80 in response to the electrified vehicle 60 being in the fluid maintenance mode or the fluid nonmaintenance mode. A drive cycle for the electrified vehicle 60 has ended when the electrified vehicle 60 is electrically coupled to the grid power source 72.

In response to a command from the controller 76, the electrical switch 80 can route power from the grid power source 72 to the traction battery 14, to the heater 88, or to both the traction battery 14 and the heater 88. Various types of switches could be used at the electrical switch 80. In one non-limiting embodiment, the electrical switch 80 is MOSFET or relay. Other types of switches could be used in other examples.

In this example, the heater 88 is disposed within the engine fluid 96 in the engine fluid container 84. In another example, the heater 88 is directly adjacent the engine fluid container 84. The heater 88, when powered, can heat the engine fluid 96 within the engine fluid container 84. The heater 88 can, in one non-limiting embodiment, raise the temperature of the engine fluid 96 within the engine fluid container 84 to be 120 degrees Fahrenheit. The heater 88 could be, for example, a resistance based heater. In this example, the heater 88 is disposed within the engine fluid 96 in the engine fluid container 84. The heater 88 is thus outside of the engine 20.

In the example of FIG. 6, the electrified vehicle 60 is in the fluid nonmaintenance mode and is electrically coupled to the grid power source 72. Since the electrified vehicle 60 is in the fluid nonmaintenance mode, heating the engine fluid 96 with the heater 88 is not required, and the controller 76 commands the electrical switch 80 to convey power from the grid power source 72 to the traction battery 14.

Figure 7:
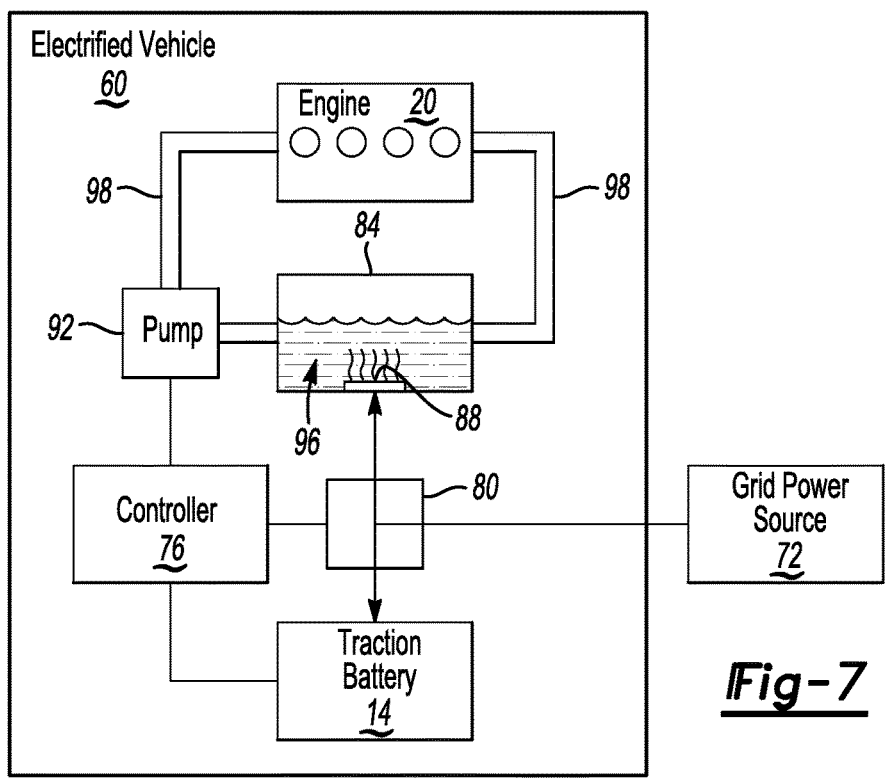
FIG. 7 illustrates a schematic view of selected portions of the electrified vehicle of FIG. 2 when the electrified vehicle is in a fluid maintenance mode and is electrically coupled to the grid power source.

In FIG. 7, the electrified vehicle 60 is in the fluid maintenance mode and is electrically coupled to the grid power source 72. Since the electrified vehicle 60 is in the fluid maintenance mode, the controller 76 conveys at least some of the power from the grid power source 72 to the heater 88 to heat the engine fluid 96 within the engine fluid container 84.

Powering the heater 88 heats the engine fluid 96 within the engine fluid container 84. Heating the engine fluid 96 when the electrified vehicle 60 is charging is considered a preheating of the engine fluid 96. The preheating raises thermal energy levels of the engine fluid 96. Accordingly, during the next drive cycle, the engine 20 will not need to operate as long to bring the engine fluid 96 to the threshold temperature, which means the electrified vehicle 60 spends less time in the fluid maintenance mode during a drive cycle. A driver of the electrified vehicle 60 thus experiences a reduction in operating time for the engine 20, which can be desirable. In some examples, the operating time for the engine 20 during the fluid maintenance mode is reduce by about one-third due to the preheating.

Features of the disclosed examples include preheating an engine fluid utilizing power from a grid power source. The preheating raises a temperature of the engine fluid. Thus, if an electrified vehicle is in a fluid maintenance mode where operating the engine is required to heat the fluid, the time spent operating the engine to raise the engine fluid to a threshold temperature can be reduced. Accordingly, the fluid maintenance mode can be exited more quickly when the engine fluid is preheated versus when the engine fluid is not preheated.

The fluid maintenance mode facilitates ensuring that contaminants are expelled from the engine fluid. Further, raising a temperature of the engine fluid can lower viscosity and, if the engine fluid circulates through an engine, reduce wear.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A fluid heating method, comprising:
operating an engine of a vehicle to heat an engine fluid during a drive cycle if the vehicle is in a fluid maintenance mode, and not operating the engine of the vehicle to heat the engine fluid during the drive cycle if the vehicle is in a fluid nonmaintenance mode; and
heating the engine fluid prior to the drive cycle if the vehicle is in the fluid maintenance mode and the vehicle is electrically coupled to a grid power source.

2. The method of claim 1, comprising heating the engine fluid prior to the drive cycle using a heater powered from the grid power source, the heater separate from any motor of the vehicle.

3. The method of claim 1, comprising charging a traction battery of the vehicle when the vehicle is connected to the grid power source.

4. The method of claim 3, comprising charging during the heating.

5. The method of claim 1, comprising heating the engine fluid prior to the drive cycle when the engine is not operating and without operating a motor of the vehicle.

6. The method of claim 1, wherein the step of operating the engine of the vehicle to heat the engine fluid during the drive cycle is performed when the vehicle is electrically decoupled from the grid power source.

7. The method of claim 1, comprising heating the engine fluid prior to the drive cycle at a location outside the engine, and outside any motor of the vehicle.

8. The method of claim 1, comprising entering the fluid maintenance mode in response to the vehicle operating without the engine operating.

9. The method of claim 1, wherein the fluid maintenance mode is an oil maintenance mode.

10. The method of claim 1, comprising operating the engine in the fluid maintenance mode to combust impurities within the engine fluid.

11. The method of claim 1, comprising exiting the fluid maintenance mode in response to the engine operating at a threshold temperature for a threshold time.

12. The method of claim 1, comprising, when the vehicle is in the fluid nonmaintenance mode, powering a motor of the vehicle to provide drive torque during the drive cycle without operating the engine.

13. The method of claim 1, comprising, when the engine is operating, circulating the engine fluid between the engine and an engine fluid container without circulating the engine fluid through any motor.

14. The method of claim 2, comprising, when the engine is operating, circulating the engine fluid between the engine and an engine fluid container, the heater disposed within the engine fluid container.

15. A fluid heating method, comprising:
heating an engine fluid prior to a drive cycle of a vehicle when the vehicle is in a fluid maintenance mode and electrically coupled to a grid power source; and
during the drive cycle, selectively operating an engine to heat the engine fluid depending on whether the vehicle is in the fluid maintenance mode or a fluid nonmaintenance mode.

16. The method of claim 15, comprising, when the engine is operating, circulating the engine fluid between the engine and an engine fluid container without circulating the engine fluid through any motor.

17. The method of claim 15, comprising heating the engine fluid prior to the drive cycle using a heater that is separate from any motor of the vehicle and any engine of the vehicle.

18. The method of claim 17, comprising, when the engine is operating, circulating the engine fluid between the engine and an engine fluid container, the heater disposed within the engine fluid container.

19. The method of claim 15, comprising, driving the vehicle during the drive cycle without operating the engine.

20. The method of claim 15, comprising powering the heating of the engine fluid prior to the drive cycle with power from the grid power source.

* * * * *